US009286012B2

(12) United States Patent  (10) Patent No.: US 9,286,012 B2
Giannetti et al.  (45) Date of Patent: Mar. 15, 2016

(54) SYSTEM AND METHOD FOR EFFICIENTLY IMPOSING A PRINT JOB IN A PRINT PRODUCTION WORKFLOW

(75) Inventors: Fabio Giannetti, Los Gatos, CA (US); Shaun Henry, Middleton, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 109 days.

(21) Appl. No.: 13/818,913

(22) PCT Filed: Sep. 1, 2010

(86) PCT No.: PCT/US2010/047525
§ 371 (c)(1),
(2), (4) Date: Feb. 25, 2013

(87) PCT Pub. No.: WO2012/030336
PCT Pub. Date: Mar. 8, 2012

(65) Prior Publication Data
US 2013/0293926 A1  Nov. 7, 2013

(51) Int. Cl.
*G06F 3/12*  (2006.01)
*G06K 15/00*  (2006.01)

(52) U.S. Cl.
CPC ............ *G06F 3/1252* (2013.01); *G06F 3/1212* (2013.01); *G06F 3/1217* (2013.01); *G06F 3/1275* (2013.01); *G06F 3/1288* (2013.01)

(58) Field of Classification Search
USPC ...................................... 358/1.15, 1.13, 1.18
See application file for complete search history.

(56) References Cited

U.S. PATENT DOCUMENTS

| 6,594,029 | B1 * | 7/2003 | Mellor et al. ............... 358/1.15 |
| 7,016,061 | B1 * | 3/2006 | Hewitt ....................... 358/1.15 |
| 2004/0218217 | A1 * | 11/2004 | Dechamps ................. 358/1.18 |
| 2005/0141006 | A1 * | 6/2005 | Aiyama ..................... 358/1.13 |
| 2006/0126119 | A1 | 6/2006 | Morales |
| 2007/0070374 | A1 * | 3/2007 | Boyes et al. ............... 358/1.13 |
| 2009/0027714 | A1 | 1/2009 | Kuhn |
| 2009/0091774 | A1 * | 4/2009 | Burkes et al. .............. 358/1.13 |
| 2010/0079300 | A1 | 4/2010 | Agata |
| 2010/0141984 | A1 * | 6/2010 | Horn et al. ................. 358/1.15 |
| 2012/0075662 | A1 * | 3/2012 | Giannetti ................... 358/1.15 |

FOREIGN PATENT DOCUMENTS

JP   2002-063004      2/2002
JP   2002063004 A  *  2/2002  ............... G06F 3/12

OTHER PUBLICATIONS

The International Search Report and the Written Opinion of the International Searching Authority dated Jun. 24, 2011; International Application Number: PCTIUS2010/047525; Filed Sep. 1, 2010.

* cited by examiner

*Primary Examiner* — Ashish K Thomas
*Assistant Examiner* — Walter Yehl
(74) *Attorney, Agent, or Firm* — Edouard A Garcia

(57) ABSTRACT

A system and method is disclosed for imposing a print job. In one example, the system discloses a computer programmed with executable instructions which operate a set of modules, including an imposition sequence module 104 which calculates a time to process the print job 102 relative to a processing operation 117, and an imposition module 114, 116, or 118 which variably imposes the print job 102 based on the time to process. In one example, the method discloses how to balance a print job 102 workflow relative to a processing operation 117, and impose the print job 102 based on the workflow balancing.

15 Claims, 3 Drawing Sheets

Printing Resource Queues 202

| Pre-RIP Queue 204 | RIP Queue 206 | Post-RIP Queue 208 |
|---|---|---|
| Print Job 2 - Portion - C | Print Job 2 - Portion - B | Print Job 1 - Portion - A |
| Print Job 3 - Portion - A | Print Job 3 - Portion - B | Print Job 1 - Portion - B |
| Print Job 3 - Portion - C | Print Job 5 | Print Job 1 - Portion - C |
| Print Job 4 | | Print Job 2 - Portion - A |
| | | Print Job 6 |

Fig. 2

SYSTEM AND METHOD FOR EFFICIENTLY IMPOSING A PRINT JOB IN A PRINT PRODUCTION WORKFLOW

BACKGROUND OF THE INVENTION

Brief Background Introduction

The present invention relates generally to systems and methods for printing. When Print Service Providers (PSPs) receive a print job, a workflow for printing is created. There are many steps to this workflow, and managing them efficiently is complex. Further improvements to print job workflows are desired.

BRIEF DESCRIPTION OF THE DRAWINGS

Some examples of the invention are described in the following figures:

FIG. 2 is a data structure diagram used by one example of the system; and

DETAILED DESCRIPTION

Figure 1:
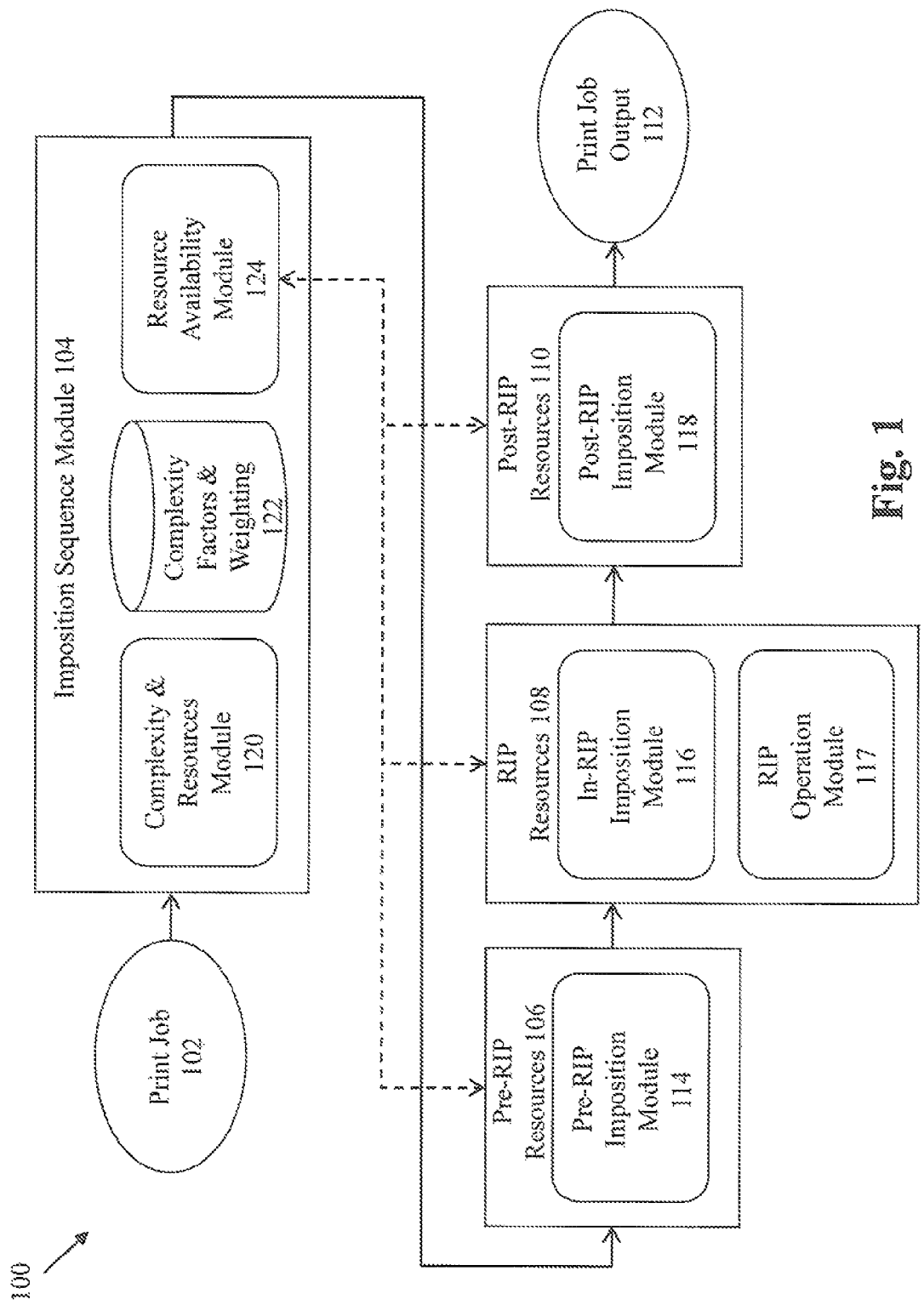
FIG. 1 is a dataflow diagram of one example of a system for imposing a print job.

Imposition is a key step provided by Print Service Providers (PSPs) as they transform received print jobs into printed matter. Imposition is a process of placing one or more print job pages on a single sheet of stock, along with several marks to enable cutting, folding, and stitching machines to generate a desired set of printed matter in an automated fashion. However, building a print production pipeline/workflow that enables imposition and other print job transformations to be most efficiently completed is a complicated task.

One efficiency metric is whether those printing devices at the end of a print production workflow (e.g. a printing press) receive a steady and predictable stream of print job data (e.g., no operational bottlenecks or workflow backlogs), even though other upstream print job operations are less predictable since they are print job dependent and vary in computational complexity as well as resource usage.

Providing such a "constant stream of print job data" is unlikely if imposition is programmed to occur at a fixed time, such as prior to a RIP(Raster Image Process) step or after the RIP step. For instance, in an impose—then RIP—then print scenario, where the order of these operations is fixed, the overall performance of the system is limited and often the printing device is starved for print job data.

The present invention addresses and remedies many, if not all, of the concerns discussed above.

The present invention is better able to provide a "constant stream of print job data" to printing devices at the end of the print production workflow by varying when print job imposition is performed. The present invention describes a system and method for variably selecting either a pre-RIP, in-RIP, or post-RIP print job imposition in order to manage overall print job processing for the greater performance (e.g. through-put) of the system as a whole.

The present invention is capable of automatically switching between these three imposition approaches on a per print job, per page, and per print job portion basis. This dynamic and automatic interleaving of pre-RIP, in-RIP, and post RIP imposition helps maintain a continuous and balanced workflow throughout the printing system, balancing usage of available printing resources.

This is possible since the present invention teaches how to analyze the print job in advance, based on complexity and resource usage, and then select either pre-RIP, in-RIP, or post-RIP imposition based on said complexity of each print job, page, or portion thereof, as well as the predicted consumption and availability of printing resources.

Great flexibility in managing the stream of print job data is further enhanced due to the present invention's focus on the imposition variable. The imposition timing variable provides data stream leverage since there is a significant difference between the speed of imposition at various print job processing stages and the speed of RIP-ing print job data that either has or has not been imposed. More specifically, imposing Page Description Language (PDL) pages into multi-page sheets is generally faster than imposing already RIPed output (i.e. color separated bitmaps). Also, RIP-ing separate PDL pages, prior to imposition, is generally faster and more scalable than RIP-ing entire sheets that have already been imposed.

Thus the present invention provides tools which help maximize the usage rate of a printing device, thereby enabling a greater number of print jobs to be printed over a given time period.

Details of the present invention are now discussed.

FIG. 1 is a dataflow diagram of one example of a system 100 for imposing a print job. FIG. 2 is a data structure diagram 200 used by one example of the system 100. Due to the integrated operation of the system 100 with the data structure 200, and to facilitate a logical understanding of the present invention, FIGS. 1 and 2 are discussed together, as needed.

Imposition is a print processing step whereby a set of print job pages, are arranged onto a single larger sheet having a physical sheet size which is compatible with a printing device that actually prints media onto the sheet. For instance, if a 20 page PDF file is to be printed on a printing device that works with sheets 4 times as large as the PDF file's page size, then imposition will arrange 4 PDF file pages onto each of the printing device's sheet, resulting in 5 sheets. Note that "printing devices" are herein defined to include both sheet and roll fed presses, web-presses, print engines, and other printing systems, apparatus, and methods.

In one example, a print job 102 is received by an imposition sequence module 104 in a PSP's (Print Service Provider's) computer system 100. The print job 102 is defined using a Page Description Language (PDL, such as PDF or Postscript or XPS); however, other print job languages are also possible.

The imposition sequence module 104 selects when various portions of the print job 102 will be imposed, during the process of transforming the print job 102 into print job output 112. Print job 102 portions are herein defined to include: the whole print job, and/or one or more divided parts of the print job, such as one page in a print job or various page regions in a print job 102.

In one example of the invention, the imposition sequence module 104 selects either pre-RIP imposition, in-RIP imposition, or post-RIP imposition for each individual portion of the print job 102, as the print job 102 is passed in turn from a pre-RIP queue 204 which buffers a set of pre-RIP resources 106, to an RIP queue 206 which buffers a set of RIP resources 108, and then to a post-RIP queue 208 which buffers a set of post-RIP resources 110. How this imposition selection is made is discussed elsewhere in this specification. One example of the queues 204, 206, and 208 is shown in FIG. 2.

While in this example, print job 102 imposition is selected relative to RIPing the print job 102 (as performed by the RIP operation module 117), in other examples, imposition may be selected relative to some other print job 102 print processing operation. The function of each of these resources 106, 108, and 110 is discussed below. Note, RIPing is print job processing step using a Raster Image Processor (RIP) which transforms an input file (e.g. a .pdf file) into a bitmap image that can be physically printed on a printer, and can in whole or in part be implemented using either hardware or software.

Pre-RIP imposition is effected by a pre-RIP imposition module 114 within the pre-RIP resources 106. The pre-RIP resources 106 are herein flexibly defined as hardware and/or software which processes the print job 102 before RIPing, and includes one or more PDL computer processors and/or PDL processing engines. The pre-RIP resources 106 process print jobs 102 as they are received in the pre-RIP queue 204, shown in FIG. 2. The Pre-RIP queue 204 may contain either entire print jobs 102 (e.g. Print Job 4) which have not been split into portions, or portions of print jobs 102 (e.g. Print Job 2-Portion-C, Print Job 3-Portion-A, and Print Job 3-Portion-C).

In addition to the standard print job processing tasks performed by the pre-RIP resources 106, if the imposition sequence module 104 selects pre-RIP imposition for all or a portion of the print job 102, then the pre-RIP imposition module 114 arranges a set of individual print job 102 PDL pages onto a single printing device sheet. The imposed print job 102 is then saved in a PDL format as well.

Pre-RIP imposition has both some benefits and drawbacks, which the imposition sequence module 104 uses to enhance the throughput efficiency of the overall system 100, as will later be discussed.

There are some benefits to pre-RIP imposition. Pre-RIP imposition has the advantage of manipulating relatively smaller sized PDL files, since such PDL tiles do not contain rendered (i.e. RIP-ed) data. Also, the resulting imposed PDL file's size is usually in proportion with the size of the original PDL file. Pre-RIP imposition is also far more efficient if the print job 102 does not have a high degree (i.e. above a predetermined threshold) of complexity, transparency, or object re-use, since it is easier and faster to assemble pre-rendered PDL pages than very large voluminous bitmaps in rendered (i.e. RIP-ed) pages. The terms complexity, transparency, and the phrase "object re-use" are presented in more detail elsewhere in this specification.

There are also some drawbacks to pre-RIP imposition. Pre-RIP imposition can remove some of the benefits of page-per-page in-RIP-ing or post-RIP-ing, like re-use and load balancing. The reason is that once the pages are imposed to a sheet, the entire, now larger, sheet needs to be RIP-ed and this slows down the RIP-ing process due to the larger sheet's size and the loss of potential object reuse. Thus, if a print job 102 is imposed before being RIP-ed, the re-use of images/object/pictures/etc. within the print job 102 is severely impacted. This is usually because imposition is done on a "per-recipient" bases, where the re-use is on a "per-page" base. For instance, it is faster to RIP 100 times the same page which has a large amount of re-use, than to RIP 20 sheets each having 5 different (i.e. un-reusable) pages. The re-use factor in the first case is 99 (1 is the first RIP) and in the second only a mere 19.

Another drawback to pre-RIP imposition is that the overall number of printing device sheets are now less than the original number of print job 102 pages. This effectively limits the ability of the imposition sequence module 104 to partition the print job 102 among several sets of RIP resources 108 for parallel processing.

After the print job 102 is processed by the pre-RIP resources 106, the print job 102 is transferred the RIP queue 206 (see FIG. 2) in the RIP resources 108.

The RIP resources 108 are herein flexibly defined as hardware and/or software which performs Raster Image Processing (RIP) on the print job 102, and includes RIP computer processors and/or RIP processing engines. The RIP resources 108 process print jobs 102 as they are received in the RIP queue 206. The RIP queue 206 may contain either entire print jobs 102 (e.g. Print Job 5) which have not been split into portions, or portions of print jobs 102 (e.g. Print Job 2-Portion-B, and Print Job 3-Portion-B).

The RIP resources 108 perform a set of print job processing tasks which include rendering a set of PDL print job 102 files into a set of color separated bitmap files. The RIP resources 108 can include a set of rendering engines which permit efficient partitioning and parallel processing (e.g. load balancing) of the print job 102 for faster throughput and better scalability.

In addition, when a print job 102 contains a larger number of images (e.g. objects) that can be re-used multiple times (e.g. such as background images) and/or the print job 102 includes a number of transparency computations, the RIP resources 108 can very efficiently re-use objects and perform these transparency computations, provided that imposition has not yet been performed. "Transparency" is when multiple layers of color or grayscale are blended/mixed as displayed by the print job output 112.

The efficiency of the RIP resources 108 diminishes, however, if imposition has already been performed, since RIP-ing entire sheets that have already been imposed is more time consuming that RIP-ing individual print job 102 pages, or portions thereof.

The RIP resources 108 also include an in-RIP imposition module 116 for performing in-RIP imposition, which is discussed below. After the print job 102 is processed by the RIP resources 108, the print job 102 is transferred the post-RIP queue 208 in the post-RIP resources 110, Post-RIP imposition is effected by a post-RIP imposition module 118 within the post-RIP resources 110. The post-RIP resources 110 are herein flexibly defined as hardware and/or software which processes the print job 102 after RIPing, including a printing device's computer processor and/or print engine which generates (e.g. prints) the actual print job output 112. The post-RIP resources 110 processes print jobs 102 as they are received in the post-RIP queue 208. The post-RIP queue 208 may contain either entire print jobs 102 (e.g. Print Job 6) which have not been split into portions, or portions of print jobs 102 (e.g. Print Job 1-Portion-A, Print Job 1-Portion-B, Print Job 1-Portion-C, and Print Job 2-Portion-A).

When post-RIP imposition is selected by the imposition sequence module 104, print job 102 pages are first RIP-ed (i.e. rendered) individually by the RIP resources 108 before being sent to the post-RIP queue 208, shown in FIG. 2.

In addition to the standard print job processing tasks performed by the post-RIP resources 110, if the imposition sequence module 104 selects post-RIP imposition for all or a portion of the print job 102, then the post-RIP imposition module 118 receives color separated bitmap files from the RIP resources 108 and imposition is performed using a raster or bit-map engine, within the post-RIP imposition module 118. The post-RIP imposition consists of placing individual print job 102 bitmapped pages into a larger bitmapped sheet.

Post-RIP imposition has both some benefits and drawbacks, which the imposition sequence module 104 uses to enhance the throughput efficiency of the overall system 100, as will later be discussed. One benefit of post-RIP imposition is that the RIP resources 108 can still RIP separate print job 102 pages, individually and often in parallel, which is both faster and more scalable than RIP-ing entire sheets that have already been imposed.

Some drawbacks to post-RIP imposition include, having to perform imposition on fully rasterized color separated bitmap files which are very large and which also increase the I/O time required to transfer the rasterized job between various networked components within the system 100. Also since these bitmap files are color separated, imposition needs to be performed at least 4 times (one for each of the CMYK color separations) for each print job 102 page. Thus imposition of the rendered (i.e. RIP-ed) color separated bitmap files can be more time consuming.

In-RIP imposition is a third imposition option, and is effected by the in-RIP imposition module 116 within the RIP resources 108. In-RIP imposition employs a fixed schema for RIP-ing and imposition that attempts to balance their benefit and drawbacks.

When the imposition sequence module 104 selects in-RIP imposition for all or a portion of the print job 102, the in-RIP imposition module 116 creates an output raster buffer that is typically the same size as the print job output 112 media (e.g. an imposition frame having a larger image). The RIP operation module 117 then renders each PDL page and the in-RIP imposition module 116 places each rendered page raster in the output raster buffer at a location and position specified by the imposition rules. The process of placing individual page rasters on a larger (aggregated) print job output 112 sheet means that the in-RIP imposition module 116 needs to allocate enough memory both to contain the output raster buffer (depending on the RIPS implementation and memory model), and for one or more of the PDL page's rasters.

Thus, depending on the internal implementation of the in-RIP imposition module 116 and it's memory model, imposition can require a significant amount of the RIP resources 108, which is taken into account when the complexity & resources module 120 (discussed below) calculates the print job's 102 complexity value. Using this complexity value, the imposition sequence module 104 will select only certain PDL pages in the print job 102 for in-RIP imposition.

The present invention, however, teaches how the imposition sequence module 104 uses to an advantage the various benefits and drawbacks of pre-RIP, in-RIP, and post-RIP imposition techniques to better manage the workflow of the pre-RIP resources 106, RIP resources 108, and post-RIP resources 110, and thereby enhance the throughput efficiency of the overall system 100.

To manage the print job 102 workflow, the imposition sequence module 104 includes a complexity & resources module 120, storage for a set of complexity factors & weightings 122, and a resource availability module 124.

These three elements 120, 122, and 124 enable the imposition sequence module 104 to ascertain the complexity and resource requirements of various portions of the print job 102 and the resource availability provided by the pre-RIP resources 106, the RIP resources 108, and the post-RIP resources 110.

With this "whole system 100" view, the imposition sequence module 104 is able to effect a "look-ahead" workflow management strategy which foresees a near moment-to-moment (e.g. real-time) resource costs and availability of performing imposition either pre-RIP, in-RIP, or post-RIP. In this way, the imposition sequence module 104 can balance computational trade-offs between a fast or slow imposition speed and a fast or slow RIP speed. In other examples of the present invention, the imposition sequence module 104 can also vary imposition timing and other print job processing steps, to minimizing licensing costs (e.g. image or character set copyrights) incurred by performing either pre-RIP, in-RIP, or post-RIP imposition.

The complexity & resources module 120 (a.k.a. Job Analysis Engine (JAE)) identifies differences (e.g. variations in complexity and resource requirements) between various portions of one or more print jobs 1102. The complexity & resources module 120 does this by searching for any complexity factors 122 in the print job 102.

The complexity factors 122 can include: a total number of pages; a number of pages containing transparencies; re-use of images/objects/photos/etc., such as background images or graphics that are used on every page or portion thereof; page ranges requiring differing specific impositions (e.g. brochure, post card, ordinary document, etc.); the print job's 102 file size (e.g. kB, MB, etc.); the image resolution of print job 102 images/objects/photos/etc.; whether copyrighted/external/high-resolution/etc. images are included; "Trapping" requirements; "Sharpening" requirements; and so on.

Depending upon a particular instantiation of the present invention, each of the complexity factors 122 may be weighted relative to one another, or relative to an predetermined scale. The complexity & resources module 120 calculates a "complexity value" based on a weighted sum of the print job's 102 complexity factors 122.

Using the complexity information generated by the complexity & resources module 120, the imposition sequence module 104 can generate a "complexity signature", showing regions of complexity, for one or more portions of each print job 102.

The complexity & resources module 120 can use the "complexity signature" to estimate a set of "required printing resources" for effecting each portion of the print job 102. This estimate can include resource calculations for imposing various print job 102 portions at either the pre-RIP, in-RIP, or post-RIP stage. In this way the imposition sequence module 104 can transform the "complexity signature" for a print job 102 into a "resource requirements signature".

The resource availability module 124 identifies a current (or recent) "printing resources availability" status for the pre-RIP resources 106, the RIP resources 108, and the post-RIP resources 110. Several alternate strategies for determining this status are possible, including: looking at each of the printing resource queues 202 (i.e. queues 204, 206, and 208); obtaining a % CPU utilization, buffering status, network bandwidth usage, etc. for each of the resources 106, 108, and 110; and so on. This status can be obtained using queries sent to the resources 106, 108, and 110, or by other system 100 monitoring techniques. The frequency at which the resource availability module 124 identifies the status can vary with each instantiation of the present invention.

The imposition sequence module 104 (a.k.a. the imposition mode decision engine (IMDE)) decides whether to impose various pages, page regions, and other portions of the print job 102 at either the pre-RIP, RIP, or post-RIP stage, based on the individual complexity factors 122, the "complexity value", the "resource requirements", and the "resource availability" information respectfully provided for each print job 102 by the complexity & resources module 120 and the resource availability module 124.

The imposition sequence module 104 uses this information (i.e. the individual complexity factors 122, the "complexity value", the "resource requirements", and the "resource availability" information) to heuristically calculate an estimated "time to process" the print job 102, or portions thereof.

By controlling when imposition is performed, the imposition sequence module 104 can vary the "time to process" estimation for the print job 102 to, in one example, maintain a constant workflow into each of the printing resource queues 202. (See in FIG. 2 an example of how the imposition sequence module 104 allotted Portions A, B, & C of Print Jobs 1, 2, and 3 to the various queues 204, 206, and 208.) Thus the imposition sequence module 104 uses to an advantage the various above mentioned benefits and drawbacks of pre-RIP, in-RIP, and post-RIP imposition to better balance the workflow between the printing resource queues 202, and thereby enhance the throughput efficiency of the overall system 100.

Several example workflow management strategies for the overall PSP system 100 are discussed below. Many other workflow management strategies are also possible based on each instantiation of the present invention.

In a first example, if at a time-T0 the post-RIP queue 208 is relatively shorter than either the pre-RIP queue 204 or RIP queue 206, then the imposition sequence module 104 may select post-RIP imposition for a print job, based on the shorter queue 208 length and a predicted "time to process" the print job using post-RIP imposition. Then, perhaps at a time-T1, as the post-RIP queue 208 lengthens relative to the pre-RIP queue 204 and the RIP queue 206, the imposition sequence module 104 receives data from the resource availability module 124 that the "resources available" have changed. In response, the imposition sequence module 104 may then select either pre-RIP or in-RIP imposition for the next print job, and so on. In this way the imposition sequence module 104 performs a form of "print job-to-print job" (e.g. moment-to-moment, real-time) workload-balancing between the pre-RIP resources 106, the RIP resources 108, and the post-RIP resources 110.

In a second example, if the print job 102 is composed of a set of 8 page brochures which have large amount of re-use for each individual page, assembling the entire brochure in two sheets eliminates most of the re-use since each RIP will rasterize the full 8 pages. A more efficient RIP-ing approach would be to have each page RIP-ed individually so that image re-use is maximized, 8 sets of RIP resources 108 (i.e. RIP engines), operating in parallel, could then rasterize each of the brochure's 8 pages in parallel, post-RIP imposition, thereby completing the print job more quickly than had pre-RIP imposition been selected.

In a third example of the present invention, the imposition sequence module 104 is programmed with instructions that focus on just one of the complexity factors 122 identified by the complexity & resources module 120. For example, if the print job 102 contains a first set of pages without transparency, pre-RIP imposition would be faster and thus could be selected by the imposition sequence module 104 with the resulting imposed sheet then being sent to a single RIP resource 108. If then other pages in the print job 102 make heavy use of transparency, the imposition sequence module 104 would then likely be programmed to send these pages individually to the RIP resources 108 with imposition then being performed by a post-RIP resource (e.g. engine).

Note that the present invention has mostly discussed workload balancing relative to RIP-ing the print job 102 (as performed by the RIP operation module 117 in the RIP resources 108). The imposition sequence module 104, however, could be reprogrammed to perform workload-balancing relative to other print job processing operations as well.

Figure 3:
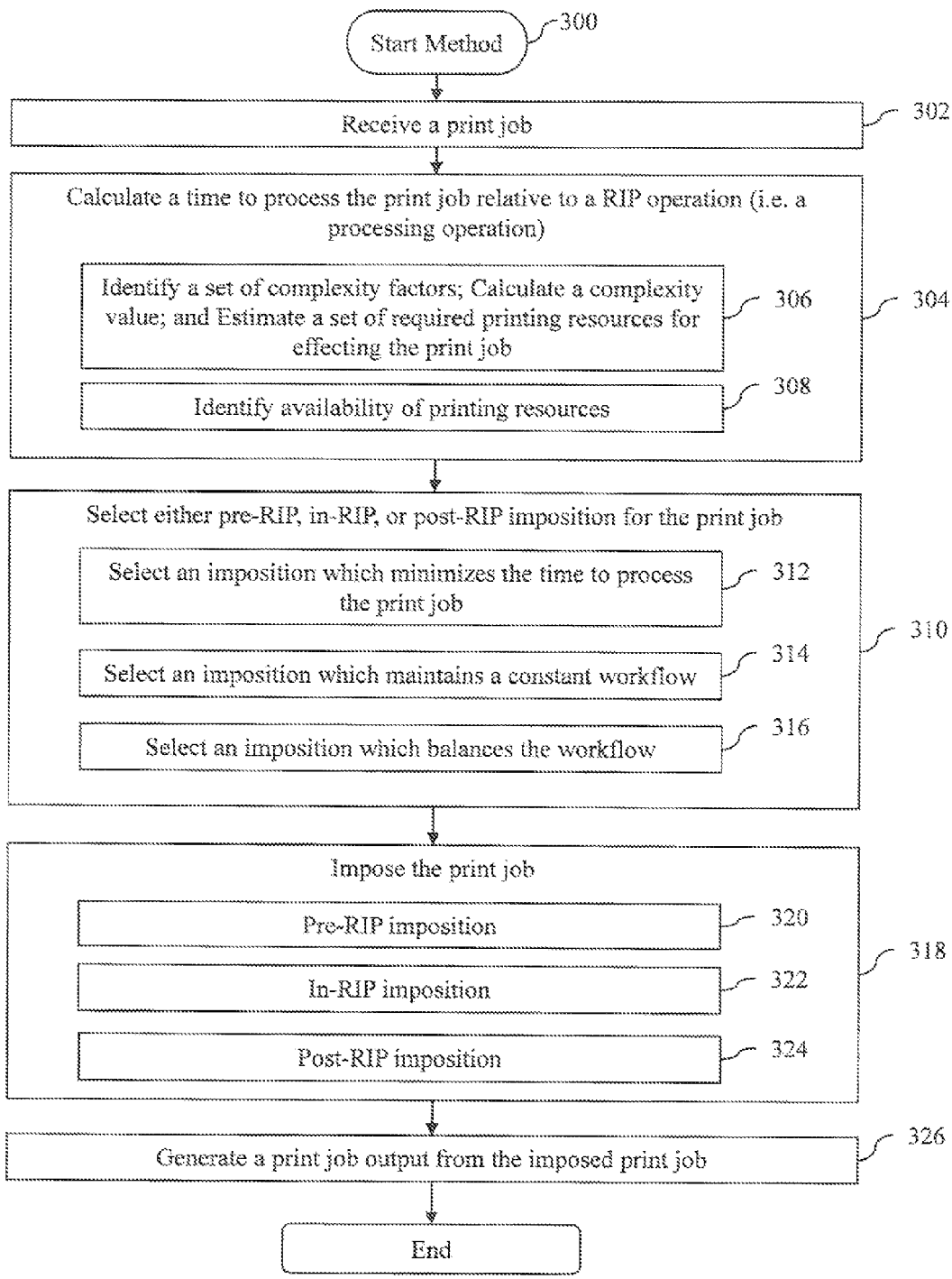
FIG. 3 is a flowchart of one example of a method for imposing a print job.

FIG. 3 is a flowchart of one example of a method 300 for imposing a print job. Those skilled in the art will recognize that while one example of the present invention's method is now discussed, the material in this specification can be combined in a variety of ways to yield other examples as well. The method next discussed is to be understood within a context provided by this and other portions of this detailed description.

The method 300 begins in block 302, where an imposition sequence module 104 in a PSP's (Print Service Provider's) computer system 100 receives a print job 102. Next, in block 304, the imposition sequence module 104 calculates a "time to process" the print job 102 relative to a processing operation 117, such as that performed by the RIP operation module 117.

Block 304, includes blocks 306 and 308. In block 306, the complexity & resources module 120: identifies a set of "complexity factors" 122 in the print job 102; calculates a "complexity value" based on a weighted sum of the print job's 102 complexity factors 122; and estimates a set of "required printing resources" for effecting the print job 102. In block 308, a resource availability module 124 identifies the availability of resources, such as the pre-RIP resources 106, the RIP resources 108, and the post-RIP resources 110.

Next in block 310, the imposition sequence module 104 selects either pre-RIP imposition 114; in-RIP imposition 116; or post-RIP imposition 118 for the print job 102 based on the complexity value, the required printing resources, and the resource availability.

Block 310, includes blocks 312, 314, and 316, which provide several imposition sequence module 104 optimization scenarios. In block 312, the imposition sequence module 104 selects an imposition which minimizes the time to process the print job 102. In block 314, the imposition sequence module 104 selects an imposition which maintains a constant workflow into each of the printing resource queues 202. In block 316, the imposition sequence module 104 selects an imposition which balances the workflow between the printing resources 106, 108, and 110, to enhance the throughput efficiency of the overall system 100.

Then in block 318, the print job 102 is imposed. Block 318, includes blocks 320, 322, and 324. In block 320, the pre-RIP imposition module 114 performs pre-RIP imposition. In block 322, the in-RIP imposition module 116 performs in-RIP imposition. In block 324, the post-RIP imposition module 118 performs post-RIP imposition.

In block 326, the printing resources 106, 108, and 110 generate a print job output 112 from the imposed print job 102.

An electronic apparatus can effect the system 100 and method 200. The electronic apparatus includes a processor device, a bus, a storage device, and algorithms.

The processor device includes a processor (such as a central processing unit, CPU, microprocessor, application-specific integrated circuit (ASIC), etc.) for controlling the overall operation of the storage device 308 (such as random access memory (RAM) for temporary data storage, read only memory (ROM) for permanent data storage, firmware, flash memory, external and internal hard-disk drives, and the like).

The processor device communicates with the storage device and algorithms using the bus and performs operations and tasks that implement one or more blocks of the flow diagrams discussed herein. The storage device, for example, stores applications, data, programs, algorithms (including software to implement or assist in implementing examples in accordance with the present invention) and other data.

While the present invention has been discussed mostly with reference to "modules", the term "engine" is a synonym, at least in the printing context. An "engine" (e.g. a print engine) includes a set of functional hardware and/or software for transforming a print job from one state to another.

As used in the specification and claims, the following words are also herein defined:

The term "printing device" is an electronic device that performs one or more functions of printing, scanning, and copying. In one example, a printing device is a printer. A printing device, however, is not limited to printers, but includes other devices, such as a scanner, a copier, a machine with facsimile operations, and/or a multi-functional device that performs two or more functions of printing, scanning, copying, and faxing.

The term "print/copy/scan" is print and/or copy and/or scan.

The term "printer" is not limited to just standard printers, but includes various other types of electronic devices that perform one or more functions such as printing, scanning, or copying.

The term "file" or "a set of files" refers to any collection of files, such as a directory of files. A "file" can refer to any data object (e.g., a document, a bitmap, an image, an audio clip, a video clip, software source code, software executable code, etc.). A "file" can also refer to a directory (a structure that contains other files).

Functional and software instructions described above are typically embodied as a set of executable instructions which are effected on a computer which is programmed with and controlled by said executable instructions. Such instructions are loaded for execution on a processor (such as one or more CPUs). The processor includes microprocessors, microcontrollers, processor modules or subsystems (including one or more microprocessors or microcontrollers), or other control or computing devices. A "processor" can refer to a single component or to plural components.

In one example, one or more blocks or steps discussed herein are automated, in other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision.

In some examples, the methods illustrated herein and data and instructions associated therewith are stored in respective storage devices, which are implemented as one or more computer-readable or computer-usable storage media or mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of examples, those skilled in the art will appreciate numerous modifications and variations thereof. It is intended that the following claims cover such modifications and variations as fall within the true spirit and scope of the invention.

What is claimed is:

1. A system for imposing a print job, comprising:
a computer programmed with executable instructions that operate a set of modules, wherein the modules comprise:
an imposition sequence module that calculates a time to process the print job relative to a RIP (Raster Image Process) operation that is performed at each of three stages in a print production workflow comprising a sequence of stages through which the print job is processed to transform the print job into print job output, and selects one of the stages of the print production workflow to impose the print job from a stage of the print production workflow comprising the RIP operation, a stage of the print production workflow preceding the RIP operation, and a stage of the print production workflow following the RIP operation based on comparing the calculated time to process at each stage; and
an imposition module that imposes the print job in the selected stage.

2. The system of claim 1:
further comprising, printing device resources which generate a print job output 112 from the imposed print job; and
wherein imposing further comprises, minimizing the time to generate the print job output 112.

3. The system of claim 1:
further comprising, a complexity and resources module which analyzes the print job for one or more complexity factors; and
wherein the imposition sequence module further calculates the time to process based on the complexity factors.

4. The system of claim 3:
wherein the complexity factors include at least one from a group including: a total number of pages; a number of pages containing transparencies; re-use of images, objects, or photos in the print job; page ranges requiring differing specific impositions; the print job's file size; the image resolution of images, objects, or photos in the print job; whether copyrighted, external, or high-resolution images are included; trapping requirements in the print job; and sharpening requirements in the print job.

5. The system of claim 3, wherein the complexity and resources module:
calculates a complexity value based on a weighted sum of the print job's complexity factors; and
uses the complexity value to estimate a set of required printing resources for processing the print job.

6. The system of claim 5:
wherein imposing includes one from a group including: pre-operation imposition; in-operation imposition; and post-operation imposition; and
wherein the required printing resources estimate includes separate resource calculations for pre-operation imposition, in-operation imposition, and post-operation imposition.

7. The system of claim 1, further comprising:
a set of pre-operation resources;
a set of operation resources;
a set of post-operation resources; and
a resource availability module which determines an availability status for the pre-operation resources, the operation resources, and the post-operation resources; and wherein the imposition sequence module further calculates the time to process based on the availability status of the resources, and.

8. The system of claim 7:
wherein the resource availability module determines the availability status by one from a group including: looking at a set of printing resource queues 202; and obtaining a percentage of CPU utilization, buffering status, or network bandwidth usage for each of the resources.

9. The system of claim 1:
wherein imposing includes one from a group including: pre-RIP imposition of the print job; in-RIP imposition of the print job; and post-RIP imposition of the print job.

10. The system of claim 9:
wherein the imposition sequence module selects the pre-RIP imposition if the print job includes at least one from a group including: complexity, transparency, and object re-use, each below a predetermined threshold.

11. The system of claim 9:
wherein the imposition sequence module selects the post-RIP imposition if the print job includes at least one from a group including: complexity, transparency, and object re-use, each above a predetermined threshold.

12. The method of claim 1, wherein the imposition sequence module calculates a respective time to process for each of multiple print jobs, and performs a print-job-to-prim-job workload balancing between the print production workflow stage comprising the RIP operation, the print production workflow stage preceding the RIP operation, and the print production workflow stage following the RIP operation based on the calculated times to process and respective availabilities of processing resources in the print production workflow stage comprising the RIP operation, the print production workflow stage preceding the RIP operation, and the print production workflow stage following the RIP operation based on the calculated times to process.

13. An article comprising at least one non-transitory computer-readable storage medium storing instructions that upon execution cause a computer system to:
calculate a time to process a print job relative to a RIP (Raster Image Process) operation that is performed in a print production workflow comprising a sequence of stages through which the print job is processed to transform the print job into print job output,
wherein calculating the time to process includes calculating the time to process at each of the stages;
select one of the stages of the print production workflow to impose the print job from a stage of the print production workflow comprising the RIP operation, a stage of the print production workflow preceding the RIP operation, and a stage of the print production workflow following the RIP operation based on comparing the calculated time to process at each stage; and
impose the print job in the selected stage.

14. The instructions of claim 13:
wherein to calculate further includes, calculating the time to process is based on at least one from a group including: a print job complexity value; a set of resources, and required by the print job; and a set of resources available to process the print job; and
wherein impose further includes, imposing a first portion of the print job prior to the RIP operation, imposing a second portion of the print job during the RIP operation, and a third portion of the print job after the RIP operation.

15. A method, effected by a computer programmed with executable instructions, for imposing print jobs in a print production workflow comprises a sequence of stages through which the print job is processed to transform the print job into print job output, comprising:
calculating a time to process the print job relative to a RIP (Raster Image Process) operation that is performed at each of the stages;
balancing the print production workflow relative to the RIP operation of the print production workflow, wherein the balancing comprises for each of the print jobs selecting a respective one of the stages of the print production workflow to impose the print job from a stage of the print production workflow comprising the RIP operation, a stage of the print production workflow preceding the RIP operation, and a stage of the print production workflow following the RIP operation based on comparing the calculated time to process at each stage; and
imposing the print jobs in the respective selected stages of the print production workflow.

* * * * *

UNITED STATES PATENT AND TRADEMARK OFFICE
CERTIFICATE OF CORRECTION

PATENT NO. : 9,286,012 B2
APPLICATION NO. : 13/818913
DATED : March 15, 2016
INVENTOR(S) : Fabio Giannetti et al.

Page 1 of 1

It is certified that error appears in the above-identified patent and that said Letters Patent is hereby corrected as shown below:

Claims

In column 11, line 26, in Claim 12, delete "prim" and insert -- print --, therefor.

Signed and Sealed this
Twenty-sixth Day of July, 2016

Michelle K. Lee
*Director of the United States Patent and Trademark Office*